(12) United States Patent
Petersen et al.

(10) Patent No.: US 10,579,503 B2
(45) Date of Patent: Mar. 3, 2020

(54) CONDITIONALLY CRASHING SOFTWARE APPLICATIONS TO TRACK SOFTWARE USE

(71) Applicant: Microsoft Technology Licensing, LLC, Redmond, WA (US)

(72) Inventors: Ian S. Petersen, Seattle, WA (US); Jeffrey J. Wall, Sammamish, WA (US); Marius C. Constantin, Redmond, WA (US); Kent C. Mai, Issaquah, WA (US); Ping Zhang, Redmond, WA (US); Somanath Krishnaswamy, Redmond, WA (US); Jeremy Littel, Seattle, WA (US); Jason T. Creighton, Bellevue, WA (US); Joyce Kuo, Seattle, WA (US); Vallabh Patade, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

(21) Appl. No.: 15/595,175

(22) Filed: May 15, 2017

(65) Prior Publication Data
US 2018/0329803 A1 Nov. 15, 2018

(51) Int. Cl.
*G06F 11/36* (2006.01)
*G06F 11/00* (2006.01)
*G06F 11/07* (2006.01)

(52) U.S. Cl.
CPC ........ *G06F 11/3636* (2013.01); *G06F 11/006* (2013.01); *G06F 11/0715* (2013.01);
(Continued)

(58) Field of Classification Search
CPC .................. G06F 11/3636; G06F 11/3664
See application file for complete search history.

(56) References Cited

U.S. PATENT DOCUMENTS

| 6,591,379 B1 | 7/2003 | LeVine et al. |
| 6,601,188 B1 | 7/2003 | Wilding |

(Continued)

OTHER PUBLICATIONS

Gomez, et al., "Reproducing context-sensitive crashes of mobile apps using crowdsourced monitoring", In Proceedings of the International Conference on Mobile Software Engineering and Systems, May 16, 2016, pp. 88-99.
(Continued)

*Primary Examiner* — Yolanda L Wilson
(74) *Attorney, Agent, or Firm* — Michael Best & Friedrich LLP

(57) ABSTRACT

Systems and methods for controlling an intentional crash of a software application. One system includes a computing device including an electronic processor. The electronic processor is configured to receive a crash setting for the software application from a configuration server. The crash setting has a first value or a second value. The electronic processor is also configured to detect an unexpected use of the software application during execution. The electronic processor is configured to, in response to detecting the unexpected use and the crash setting having the first value, intentionally crash the software application causing a generation of a crash report describing a state of the software application when the unexpected use occurred. The electronic processor is configured to, in response detecting the unexpected use and the crash setting having the second value, not intentionally crash the software application.

15 Claims, 3 Drawing Sheets

(52) U.S. Cl.
CPC ........ *G06F 11/0778* (2013.01); *G06F 11/366* (2013.01); *G06F 11/3664* (2013.01); *G06F 11/3668* (2013.01); *G06F 2201/86* (2013.01); *G06F 2201/865* (2013.01)

(56) References Cited

U.S. PATENT DOCUMENTS

| | | | |
|---|---|---|---|
| 7,702,955 | B2 | 4/2010 | de Almeida et al. |
| 8,448,152 | B2 | 5/2013 | Moore et al. |
| 8,473,251 | B1 | 6/2013 | Noth et al. |
| 8,516,308 | B1 | 8/2013 | Gill et al. |
| 9,317,254 | B1* | 4/2016 | Yim .......................... G06F 8/20 |
| 2006/0143540 | A1 | 6/2006 | Burk |
| 2006/0179349 | A1 | 8/2006 | Tyma et al. |
| 2006/0271825 | A1* | 11/2006 | Keaffaber ........... G06F 11/3688 714/38.13 |
| 2007/0168970 | A1* | 7/2007 | Li ........................ G06F 9/5038 717/124 |
| 2007/0174653 | A1* | 7/2007 | Berman ........... G01N 35/00623 714/2 |
| 2007/0192386 | A1* | 8/2007 | Fries ................... G06F 11/1451 |
| 2009/0089621 | A1* | 4/2009 | Zhang ................. G06F 11/0715 714/38.1 |
| 2012/0151268 | A1* | 6/2012 | Dearing ............. G06F 11/3632 714/38.1 |
| 2015/0161025 | A1* | 6/2015 | Baset .................. G06F 11/3612 714/38.1 |
| 2015/0220420 | A1* | 8/2015 | Boneti ................ G06F 11/3636 714/37 |
| 2016/0285712 | A1 | 9/2016 | Mankovskii et al. |
| 2017/0242784 | A1* | 8/2017 | Heorhiadi ........... H04L 41/5038 |

OTHER PUBLICATIONS

"International Search Report and Written Opinion Issued in PCT Application No. PCT/US2018/027692", dated Jul. 30, 2018, 17 Pages.

* cited by examiner

CONDITIONALLY CRASHING SOFTWARE APPLICATIONS TO TRACK SOFTWARE USE

FIELD

Embodiments described herein relate to intentionally crashing a software application and, in particular, to intentionally crashing a software application to identify use cases for the software application while limiting user inconvenience.

SUMMARY

Modern software applications present users with a variety of features, which users can select or interact with in a variety of sequences, formats, and combinations. Depending on the complexity and number of the features, it may be difficult to identify every such sequence, format, or combination of using each feature. For example, when a software developer implements an icon selectable within a user interface, the software developer may not be aware of or be able to easily identify every sequence, format, or combination in which the icon may be selected. Thus, the software developer may only implement a defined set of expected uses of the software application.

To identify other uses of the software application (unexpected uses) that may also need to be implemented, the software developer may code one or more intentional crashes within the software application. For example, when an unexpected use is detected, the software developer may design the software application to intentionally crash. When a software application intentionally crashes, the operating system installed on the device executing the software application may be configured to generate a crash report. The crash report may define a state of the software application (for example, in a memory map) or the operating system at the time of crashing, including data describing a state of the software application when the unexpected use occurred. Thus, the software developer may use the crash report to identify common uses of the software application that may need to be implemented.

Although intentionally crashing the software application provides the software developer with valuable information regarding how the software application is used, the crash inconveniences users of the software application. In particular, the software application may need time to restart after a crash, and, in some embodiments, the user may be required to manually restart the software application. In addition, the user may need to spend time and computer resources returning the software application to a state when the crash occurred. Furthermore, each time the user attempts to perform the same unexpected use, the software application may crash, which further inconveniences and frustrates the user.

Accordingly, to limit user inconvenience, embodiments described herein conditionally perform intentional software crashes. For example, the systems and methods described herein detect unexpected uses of a software application, such as the selection by a user of a particular feature within a particular sequence, format, or combination, that the software application is not configured to respond to. Rather than intentionally crashing the software application any time unexpected use is detected, the systems and methods described herein initially determine a value of a crash setting. The crash setting specifies whether intentionally crashing should be performed in response to such unexpected use. For example, the crash setting may have either a first value (crash value) or a second value (do-not-crash value). The first value may be associated with intentionally crashing the software application, and the second value may be associated with not intentionally crashing the software application. The crash setting may be controlled by a central controller for individual instances of a software application to limit user inconvenience. For example, after a user experiences an intentional crash or the software developer has acquired sufficient use case information through previous intentional crashes, the crash setting may be changed from the first value to the second value to effectively turn off intentional crashing. Accordingly, when the crash setting is set to the second value, the software application is not intentionally crashed in response to unexpected use.

In particular, one embodiment provides a system for controlling an intentional crash of a software application. The system includes a computing device including an electronic processor. The electronic processor is configured to receive a crash setting for the software application from a configuration server. The crash setting has a first value or a second value. The electronic processor is also configured to an unexpected use of the software application during execution. The electronic processor is configured to, in response to detecting the unexpected use and the crash setting having the first value, intentionally crash the software application causing a generation of a crash report describing a state of the software application when the unexpected use occurred. The electronic processor is further configured to, in response detecting the unexpected use and the crash setting having the second value, not intentionally crash the software application.

Another embodiment provides a method for controlling an intentional crash of a software application. The method includes receiving a crash setting for the software application from a configuration server, the crash setting having a first value or a second value. The method also includes detecting a predetermined use of the software application during execution. The method includes, in response to detecting the predetermined use and the crash setting having the first value, intentionally crashing, with the electronic processor, the software application causing generation of a crash report describing a state of the software application when the predetermined use occurred. The method further includes, in response to detecting the predetermined use and the crash setting having the second value, not intentionally crashing the software application.

Yet a further embodiment provides a non-transitory computer-readable medium including instructions executable by an electronic processor to perform a set of functions. The set of functions includes receiving a crash setting for a software application from a configuration server, the crash setting having a first value or a second value. The set of functions also includes detecting a predetermined use of the software application during execution. The set of functions further includes, in response to detecting the unexpected use and the crash setting having the first value, intentionally crashing the software application causing a generation of a crash report describing a state of the software application when the predetermined use occurred and transmitting the crash report to a crash reporting server. In addition, the set of functions includes, in response to detecting the predetermined use and the crash setting having the second value, not intentionally crashing the software application.

DETAILED DESCRIPTION

Figure 1:
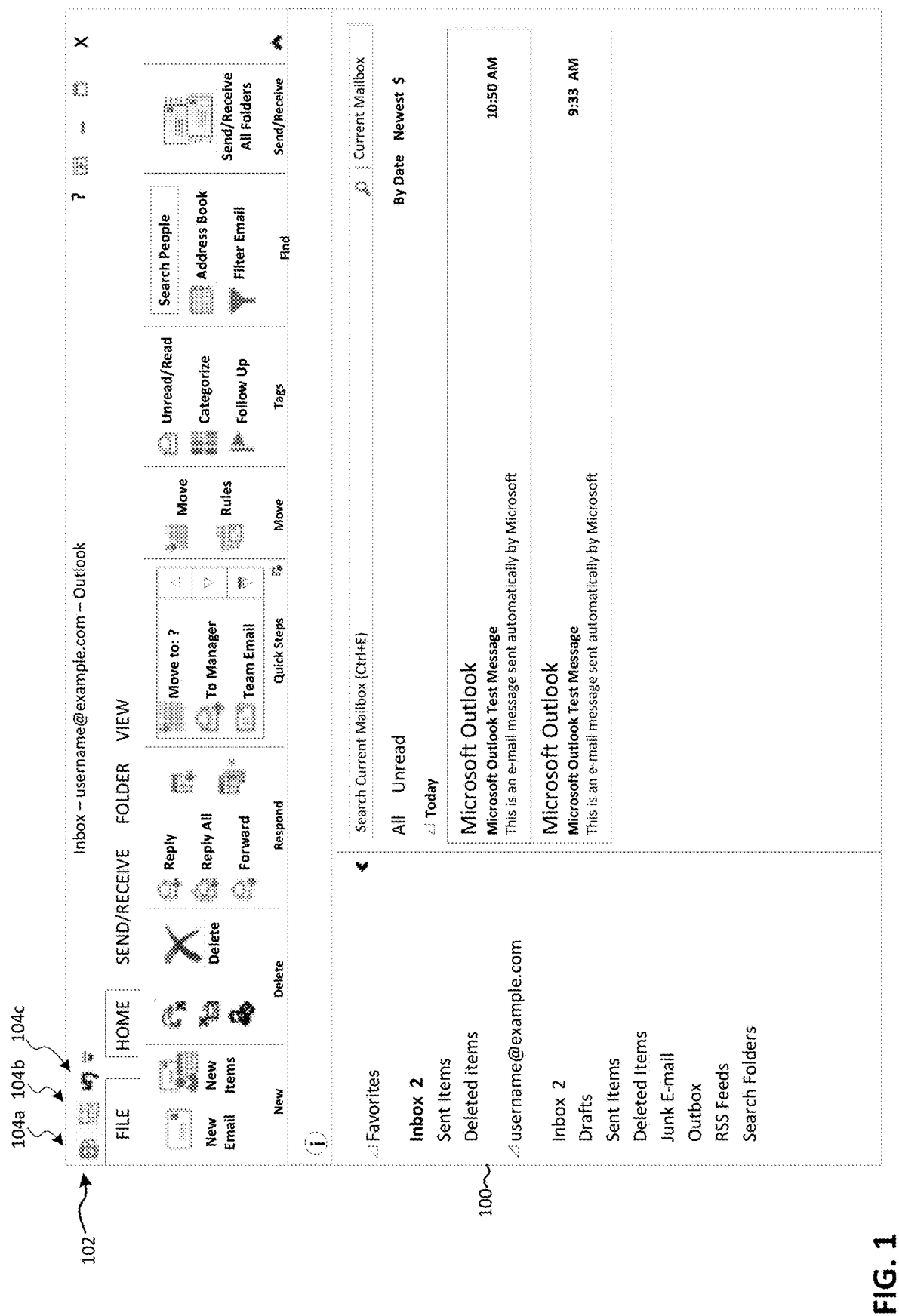
FIG. 1 illustrates a user interface provided by a software application according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As described above, a software developer may not be able to identify and, thus, implement all possible uses of a software application. For example, assume a software developer is developing a software application that presents a variety of user interfaces. Each user interface may be associated with one or more tool bars, menus, icons (or other selection mechanisms) that allow users to perform particular functionality and the features available through the displayed selection mechanism may be based on or associated with the currently-displayed user interface. For example, when a user views a print preview of an electronic file within a user interface, the selection mechanisms provided within the user interface may be limited to features associated with printing the electronic file.

In some embodiments, the software application also allows a user to set one or more selection mechanisms as a quick access selection mechanism. For example, the software application may allow a user to add icons to a quick access tool bar. The quick access tool bar may be available for each user interface presented by the software application. Accordingly, in this situation, the software developer may be unaware of what particular icons a user may add to the quick access tool bar and, thus, what features a user may attempt to use within a particular user interface. As one example, an email client application, such as Outlook® provided by Microsoft Corporation, may allow a user to add email accounts accessible through the application, including email accounts accessible using the Internet Message Access Protocol (IMAP) or the Post Office Protocol (POP). The email client application may also provide features that allow a user to specifically manage these added email accounts, and icons representing these features may be added to a quick access tool bar within the email client application. For example, FIG. 1 illustrates an example user interface 100 provided within Outlook®. The upper left corner of the user interface 100 includes a quick access toolbar 102 including icons 104a, 104b, and 104c.

When users add icons (for example, icons 104b, 104c) to the quick access toolbar relating to IMAP or POP accounts, these icons may be always available even within user interfaces generated by the email client application that are unrelated to IMAP or POP accounts. For example, within a user interface showing search results of a query performed on email mailbox, the software developer may not have anticipated that a user may select an icon associated with an IMAP or POP account. Accordingly, when a user selects such an icon within the search results user interface, the email client application may not include any code to respond to such use of the icon and, thus, the user may not receive the functionality he or she expects.

Accordingly, even based on this sole example, it is difficult (if not impossible) for a software developer to identify and fully implement in a software application all possible uses of the software application. Thus, a software developer may want to track unexpected (unimplemented) uses of a software application to identify how users use the software application and any software updates that may be needed to better provide full and expected functionality to users.

One way to track such unexpected uses is to intentionally crash of the software application when an unexpected use occurs, which provides a crash report. In one embodiment, a crash of a software application includes a sudden failure of the software application that is not a normal shutdown of the software application. The crash report associated with such crashes provides a software developer with information on the state of the software application and how the software application was being used at the time of the crash (when the unexpected use occurred), which the software developer may use to update the software accordingly.

Software crashes, however, inconvenience users who must spend time and computer resources recovering from such a crash. Accordingly, embodiments described herein control whether a software application is intentionally crashed in response to an unexpected use. In particular, as described in further detail below, configuration settings provided through a configuration server to individual instances of a software application may be used to control (for example, turn on and turn off) intentional crashing to limit user inconvenience. Such configuration settings may also be used to define a default action (other than crashing) to take in response to such unexpected software uses until a software update is available.

Figure 2:
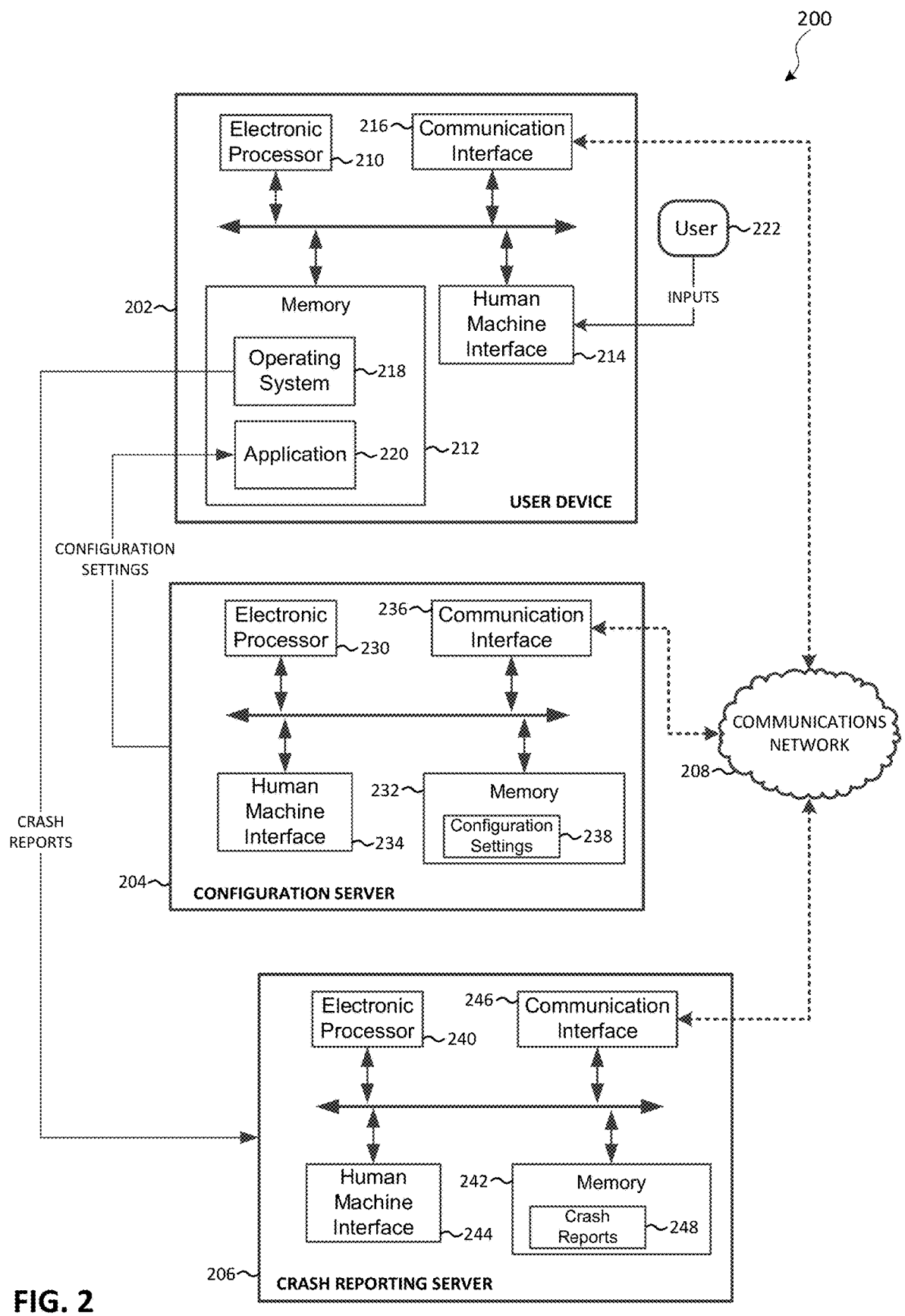
FIG. 2 schematically illustrates a system for executing a software application according to some embodiments.

For example, FIG. 2 illustrates an example system 200 for executing a software application. As illustrated in FIG. 2, the system 200 includes a user device 202, a configuration server 204, and a crash reporting server 206. It should be understood that the system 200 is provided as one example and, in some embodiments, the system 200 may include additional components. In particular, the system 200 may include multiple user devices 202 and the functionality described herein as being performed by the configuration server 204 and the crash reporting server 206 may be combined and distributed in various configurations. For example, in some embodiments, the functionality of the configuration server 204 and the crash reporting server 206 may be combined and performed by a single server.

The user device 202, the configuration server 204, and the crash reporting server 206 are communicatively coupled by at least one communications network 208. The communications network 208 may be implemented using a wide area network, such as the Internet, a local area network, such as a Bluetooth™ network or Wi-Fi, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, and combinations or derivatives thereof. In some embodiments, rather than or in addition to communicating over the communications network 208, the user device 202, the configuration server 204, the crash reporting server 206, or combinations thereof, may communicate over one or more dedicated (wired or wireless) connections.

The user device 202 is a computing device, such as a laptop computer, desktop computer, tablet computer, computer terminal, smart telephone, smart watch, smart television, and the like. As illustrated in FIG. 2, the user device 202 includes an electronic processor 210 (for example, a microprocessor, application-specific integrated circuit (ASIC), or other suitable electronic device configured to execute instructions), a memory 212, a human machine interface 214, and a communication interface 216. The electronic processor 210, the memory 212, the human machine interface 214, and the communication interface 216 are communicatively coupled over one or more communication lines or buses, wirelessly, or combinations thereof. It should be understood that, in other constructions, the user device 202 includes additional, fewer, or different components than those illustrated in FIG. 2.

The communication interface 216 may include a wireless transmitter or transceiver for wirelessly communicating over the communications network 208. Alternatively or in addition to a wireless transmitter or transceiver, the communication interface 216 may include a port for receiving a cable, such as an Ethernet cable, for communicating over the communications network 208 or a dedicated wired connection. It should be understood that, in some embodiments, the user device 202 communicates with the configuration server 204, the crash reporting server 206, or both through one or more intermediary devices, such as routers, gateways, relays, and the like.

The memory 212 includes a non-transitory, computer-readable storage medium storing program instructions and data. The electronic processor 210 is configured to retrieve from the memory 212 and execute, among other things, software (executable instructions) to perform a set of functions, including the methods described herein. As illustrated in FIG. 2, in some embodiments, the memory 212 stores an operating system (OS) 218 and a software application 220. It should be understood that the memory 212 may store additional applications, data, or combinations thereof. Also, in some embodiments, the OS 218 and the software application 220 may be stored in separate memories.

The OS 218 may be, for example, one of the Windows® family of operating systems provided by Microsoft Corporation. The OS 218, when executed by the electronic processor 210, may control use of the components included in the user device 202, including the electronic processor 210, the memory 212, the human machine interface 214, the communication interface 216, or combinations thereof. In some embodiments, as also described in more detail below, the OS 218 generates and outputs (stores, transmits, or both) crash reports when the software application 220 crashes (intentionally or otherwise).

The software application 220, when executed by the electronic processor 210, allows a user (for example, the user 222) to, for example, access, create, edit, store, transmit, and receive data, such as emails, documents, and the like. For example, the software application 220 may include a word processing application, a spreadsheet application, a communication application (for example, an email client application, a video chat application, and the like), a drawing application, a researching application (for example, a browser application), an application that combines functions of the foregoing, or the like. In some embodiments, the software application 220 is one of the Microsoft Office® suite of applications (for example, Outlook®, Word®, Excel®, PowerPoint®, Internet Explorer®, and the like).

The human machine interface (HMI) 214 receives input from, and provides output to, users (for example, the user 222) of the user device 202. The HMI 214 may include a keyboard, a keypad, a microphone, a camera, a cursor-control device (for example, a mouse, a joystick, a trackball, a touch pad, and the like), a display (for example, a liquid crystal display (LCD), a light emitting diode (LED) display, a touchscreen), a speaker, and the like. The HMI 214 communicates with the OS 218 to send and receive data to and from the OS 218 and the software application 220. In particular, input from a user of the software application 220 are communicated from the HMI 214 to the OS 218, which conveys the input (or a portion or version thereof) to the software application 220. It should be understood that some components of the HMI 214, for example, a touchscreen, function both as an input device and an output device.

As illustrated in FIG. 2, the configuration server 204 is also a computing device that includes an electronic processor 230, a memory 232, an HMI 234, and a communication interface 236, which may be similar to the electronic processor 210, memory 212, HMI 214, and communication interface 216 described above for the user device 202. The components of the configuration server 204 are communicatively coupled over one or more communication lines or buses, wirelessly, or combinations thereof. It should be understood that, in other constructions, the configuration server 204 includes additional, fewer, or different components than those illustrated in FIG. 2. It should also be understood that, in some embodiments, multiple user devices 202 (or other types of computing devices) may communicate with the configuration server 204. Furthermore, in some embodiments, the configuration server 204 may be included as part of a cloud service including multiple servers.

As illustrated in FIG. 2, the memory 232 included in the configuration server 204 may store, among other applications, data, or both, configuration settings 238 for the user device 202. The configuration settings 238 may include a crash setting that controls whether the software application 220 should be intentionally crashed. As described in more detail below, the configuration server 204 transmits the configuration settings 238 to the user device 202, for example, via the communications network 208.

As illustrated in FIG. 2, the crash reporting server 206 is also a computing device that includes an electronic processor 240, a memory 242, an HMI 244, and a communication interface 246, which may be similar to the electronic processor 210, memory 212, HMI 214, and communication interface 216 described above for the user device 202. The components of the configuration server 204 are communicatively coupled over one or more communication lines or buses, wirelessly, or combinations thereof. It should be understood that, in other constructions, the crash reporting server 206 includes additional, fewer, or different components than those illustrated in FIG. 2. It should also be understood that, in some embodiments, multiple user devices 202 (or other types of computing devices) may communicate with the crash reporting server 206. Furthermore, in some embodiments, the crash reporting server 206 may be included as part of a cloud service including multiple servers. In addition, as noted above, in some embodiments, the crash reporting server 206 may be combined with the configuration server 204.

As illustrated in FIG. 2, the memory 242 included in the crash reporting server 206 may store, among other data or applications, one or more crash reports 248 generated by the OS 218 included in the user device 202. As noted above, when the software application 220 executed by the user device 202 crashes, the OS 218 may be configured to generate and output a crash report 248, which may be transmitted from the user device 202 to the crash reporting server 206, for example, via the communications network 208. Once received at the crash reporting server 206, software developers (directly or through one or more software applications) may access the crash reports 248 and use the crash reports 248 to identify software bugs or performance issues as well as use cases for the software application 220 as described in more detail below.

Figure 3:
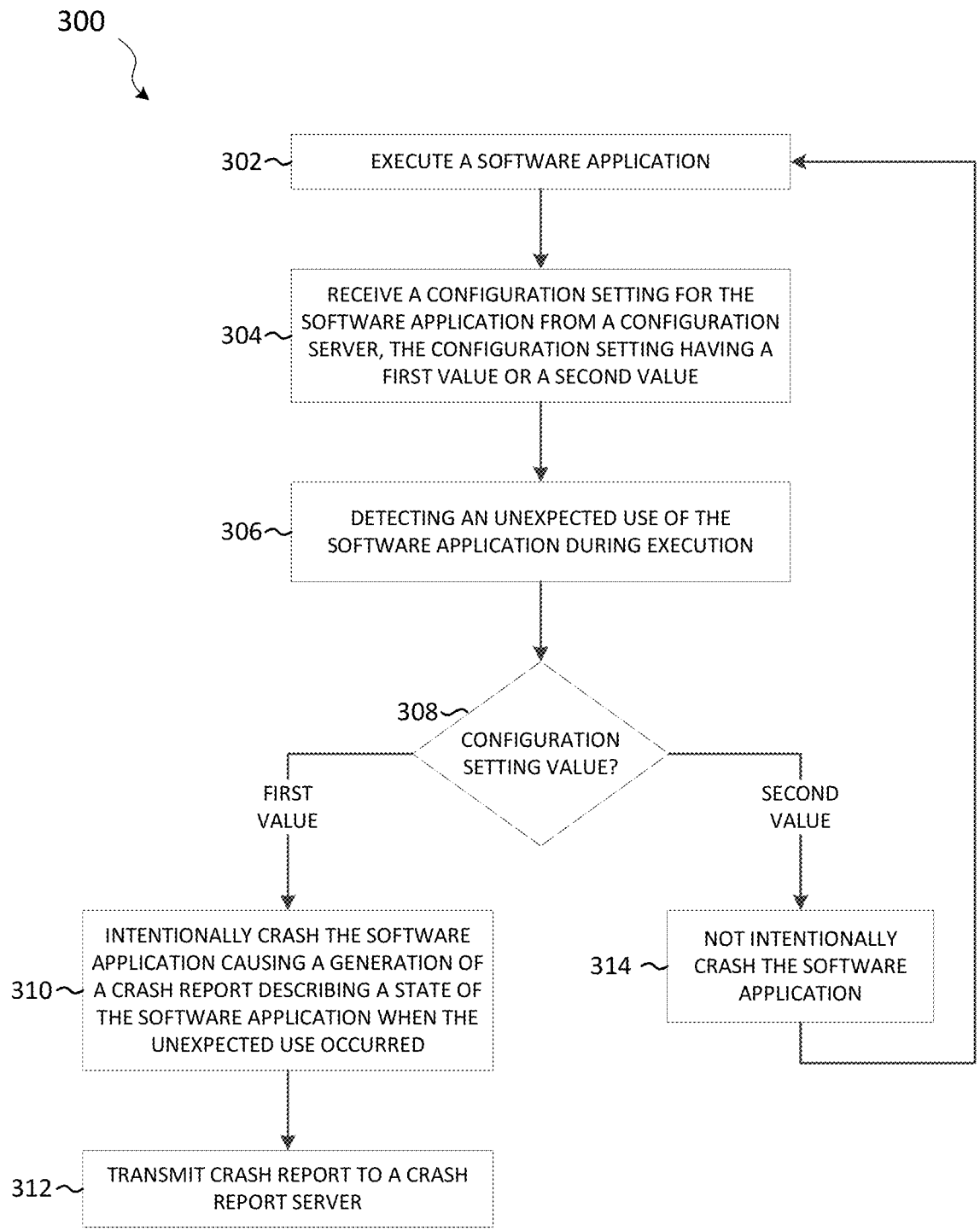
FIG. 3 is a flowchart illustrating a method of controlling an intentional crash of a software application performed by the system of FIG. 2 according to some embodiments.

As noted above, unexpected uses of the software application 220 may be tracked by intentionally crashing the software application 220. Such intentionally crashing, however, inconvenience users of the software application 220. Accordingly, to limit such user inconvenience, it is desirable to control the intentional crashing. FIG. 3 illustrates a method 300 for controlling an intentional crash of a software application according to one embodiment. The method 300 is described as being performed by the user device 202 and, in particular, the electronic processor 210. However, it should be understood that in some embodiments, portions of the method 300 may be performed by other devices, including for example, the configuration server 204 and the crash reporting server 206.

As illustrated in FIG. 3, the method 300 includes executing the software application 220 with the electronic processor 210 (at block 302). The software application 220 may be executed in response to a manual request from a user of the user device 202 (for example, the user 222) or may be executed automatically (for example, upon startup of the user device 202). The method 300 also includes receiving a crash setting for the software application 220 (at block 304). The electronic processor 210 may receive the crash setting from the configuration server 204. For example, in some embodiments, the software application 220 is configured to request the crash setting when the software application 220 is initially executed (started) or in response to other triggering events, such as at a predetermined frequency while the software application 220 is being executed or in response to unexpected use. For example, in some embodiments, the software application 220 is configured to receive the crash setting (as part of a set of configuration settings) from the configuration server 204 in response to detecting unexpected use. Alternatively or in addition, the configuration server 204 may be configured to push configuration settings, including the crash setting, to the user device 202 in response to manual requests, when configuration settings are modified, at predetermined frequencies, or a combination thereof. Upon receipt, the electronic processor 210 may store received configuration settings, including the crash setting, to the memory 212.

In some embodiments, configuration settings, including the crash setting, are centrally controlled through the configuration server 204 to control the deployment of particular software applications or features of software applications to particular users, which is sometimes referred to as software fighting. For example, the crash setting may be provided within a set of configuration settings that form a user profile (for example, associated with the user 222). The user profile includes, in addition to the configuration setting, other application, user, and system preferences and settings for a user of the user device 202. Thus, different users may be assigned different user profiles with different configuration settings, and these settings may be updated independently or for individual users or groups of users. In some embodiments, the crash setting is provided along with or as part of a new portion of executable code, which is provided to the user device 202 to replace code that originally shipped in the pre-compiled binary of the software application 220 (for example, as part of a software update). Accordingly, the configuration settings provide a mechanism to control instances of a software application executed on a plurality of devices (user devices) without having to distribute different code to each user or routinely distribute updated code.

The crash setting received by the electronic processor 210 has (at least) a first value or a second value. As described more particularly below, in one embodiment, the first value (a crash value) is associated with intentionally crashing the software application 220, and the second value (a do-not-crash value) is associated with not intentionally crashing the software application 220. It should be understood that the crash setting received by the electronic processor 210 may include a set of related settings for intentional crashing. For example, in addition to turning on or off intentional crashing of the software application 220, the crash setting or additional received configuration settings may specify other conditions that control whether the software application 220 is intentionally crashed. These other conditions may include but are not limited to, a predetermined time (including a predetermined date) when intentional crashes may occur or may not occur, a predetermined geographical location or area of the user device where crashes may occur or may not occur, a predetermined set of other software applications being executed by the user device 202 that may impact whether a crash may occur, a predetermined subscription level of a user, a predetermined type of unexpected use, and the like. When such conditions are received from the configuration server 204, the electronic processor may determine whether each condition is satisfied (or not satisfied) to determine whether or not to intentionally crash the software application 220.

Furthermore, in some embodiments, the electronic processor 210 receives a single crash setting for one or more software applications. In other embodiments, the electronic processor 210 receives a single crash setting for a particular software application, such as a specific crash setting for the software application 220. In yet other embodiments, the electronic processor 210 receives a plurality of crash settings for the software application 220. In particular, a separate crash setting may be provided for different types of unexpected uses (different software objects, and the like).

During execution, the software application 220 presents users (for example, the user 222) with a variety of features, with which users can use in a variety of sequences, formats, and combinations (each a "use" of the software application 220). In some embodiments, the features are presented to and selectable by the user 222 for use through one or more user interfaces of the software application 220 using, for example, icons, menus, or other selection mechanisms. The available selection mechanisms may be based on what user interfaces or what portions of a user interface is currently presented, what mode the software application 220 is currently operating in, the current settings from a user profile, or combinations thereof. As the user 222 interacts with and operates the software application 220, the electronic processor 210 detects the user's use of the software application 220. For example, the user 222 may click or otherwise select an icon (through the HMI 214) and the selection of the icon (within the current state of the software application 22) corresponds to use of the software application 220.

As noted above, in some situations, particular uses of a software application are unexpected. For example, an unexpected use may be a use for which there is no corresponding code to execute or the calling of code that is unexpected (for the current state of the software application). In particular, as one example, a software object (in object-orientated programming) may receive a request (a function call) to a method that is not implemented in that software object. As noted above, the complexity and number of features available in the software application 220 may make it difficult for a software developer to identify every possible use of the software application 220. As a consequence, not all uses may be implemented in the software application 220 (for example, all methods may not be available in all objects). For example, as illustrated in FIG. 1 and noted above, users may place icons within a quick access toolbar that correspond to features that a software developer is not expecting to be available in various states of the software application 220.

In some embodiments, an unexpected use may cause the software application 220 to malfunction, generate an error or exception, or cause no action to be taken (for example, because the unexpected use is not implemented in that portion of the software application 220). Such results, however, may not be reported to the software developer, which makes it difficult for the software developer to identify unimplemented uses.

Accordingly, in response to detecting the unexpected use of the software application 220 (at block 306), the electronic processor 210 checks the value of the applicable crash setting (at block 308). As noted above, the applicable crash setting may include a specific crash setting for the software application 220 or a specific crash setting for a particular type of unexpected use. In response to the crash setting having the first value (crash value), the electronic processor 210 intentionally crashes the software application 220 in response to the unexpected use (at block 310). In some embodiments, the electronic processor 210 calls a function or routine that triggers a crash. For example, in some embodiments, the electronic processor 210 calls a VerifyElseCrash function in this situation, which evaluates a passed Boolean value and crashes the software application 220 when the passed Boolean value is false. Accordingly, in this example, the electronic processor 210 may call the VerifyElseCrash function and pass the function a Boolean value of "false" to intentionally crash the software application 220. In some embodiments, the intentional crash triggers the generation of a crash report. For example, the OS 218 may detect when the software application 220 has crashed and generate the crash report. In some embodiments, the crash report includes a memory dump of a portion of the memory 212 corresponding to the software application 220, which describes the state of the software application 220 when the unexpected use occurred. In some embodiments, the crash report also includes information on the state of the OS 218 when the unexpected use occurred. The crash report may be used by the software developer to determine the circumstances surrounding the unexpected use. For example, the developer may determine in what mode the software application 220 was operating, what sequence of operations preceded the unexpected use, and other information that may be useful for making updates to the software application 220. For example, the software developer may decide that the unexpected use should be implemented.

In some embodiments, the electronic processor 210 outputs the generated crash report by storing the crash report to the memory 212 included in the user device 202. Alternatively or in addition, the electronic processor 210 may transmit the crash report to the crash reporting server 206 (at block 312), or another computing device (for example, the configuration server 204). For example, the OS 218 may generate and transmit a crash report automatically as part of handling an application crash. Alternatively or in addition, the OS 218 may prompt a user to approve or reject the generation of the crash report, the transmission of the crash report, or both.

Alternatively, as illustrated in FIG. 3, in response to the crash setting having the second value (do-not-crash value), the electronic processor 210 does not intentionally crash the software application 220 in response to the unexpected use of the software application 220 (at block 314). Rather, the electronic processor 210 may take one or more actions in this situation. For example, in some embodiments, the electronic processor 210 ignores the unexpected use and continues executing the software application 220 when the crash setting has a second value. In other embodiments, the electronic processor 210 responds to the unexpected use when the crash setting has a second value by generating an error message, such as, for example, a pop-up dialog box, that alerts the user to the unexpected use and prompts the user as to whether the user device 202 should report the error (for example, through a crash or separate from a crash). In still other embodiments, the electronic processor 210 may provide a default action in response to the unexpected use when the crash setting is set to the second value, such as displaying a "home" or "starting" user interface or the like.

In some embodiments, the default response may be specified through one or more configuration settings received from the configuration server 204. Accordingly, in some embodiments, a different default value may be defined for particular unexpected uses to improve performance of the software application 220 even if an update to the software application 220 cannot be provided to the user device 202.

As noted above, in addition to the crash setting (or as part of the crash setting) further conditions may be specified to control when a software application is intentionally crashed. For example, in addition to determining whether the crash setting has the first value or the second value, the electronic processor 210 may consider other conditions, such as a time or date of the unexpected use, a type of the unexpected use, a user subscription level, a geographic location of the user device 202, other software applications being executed by the electronic processor 210, and the like, before determining whether to intentionally crash the software application 220.

Since the crash setting is set through the configuration server 204, the crash setting may be dynamically controlled as needed to balance the tracking of software use and user inconvenience. For example, even when a crash setting is set to the first value, the crash setting may be later set to the second value through the configuration server 204 and vice versa, and the updated crash setting can be provided to user devices 202 as described above. For example, in some embodiments, after a user experiences an intentional crash, the crash setting for that user may be (manually or automatically) set through the configuration server 204 to the second value to stop further intentional crashes for the user. Similarly, when a sufficient number of software uses have been tracked, the crash settings may be set (manually or automatically) through the configuration server 204 to the second value to stop future intentional crashes. For example, counts of intentional crashes may be tracked (locally by the user device 202, or remotely by the crash reporting server 206, the configuration server 204, a separate device, or a combination thereof) and compared with configurable crash count thresholds to identify when intentional crashing should be turned on or off. In some embodiments, when types of intentional crashes are tracked separately, different crash count thresholds may be used for different types of crashes. Similarly, in some embodiments, different crash count thresholds may be used for different users, different types of users, and the like. Also, in some embodiments, the configuration settings may be used to change default responses to unexpected uses of a software application. For example, until or in place of providing a software update, a configuration setting may be used to provide an appropriate default response to an unexpected use. It should also be understood that, in some embodiments, the electronic processor 210 (through execution of the OS 218, the software application 220 or a separate application) may dynamically change configuration settings, including the crash setting as described above with respect to the configuration server 204. For example, the electronic processor 210 may be configured to automatically update the crash setting to the second value (the do-not-crash value) after a user experiences an intentional crash. In some embodiments, changes made by the electronic processor 210 may be temporary until updated configuration settings are received from the configuration server 204.

It should be understood that the functionality described above as being performed by the software application 220 may be performed by or distributed among the OS 218 or another software application executed by the user device 202, the configuration server 204, or the crash reporting server 206. Furthermore, intentionally shutting down a software application may not only inconvenience a user interacting with the software application, but may similarly inconvenience another application or computing device interacting with the software application. Accordingly, the methods and systems described herein may be used with systems that may or may not include user devices. In addition, the functionality described herein may be used identify unexpected (unimplemented) uses of a software application or any type of predetermined use. For example, when a software developer wants to track whether a particular expected (implemented) feature is being used, the software developer may intentionally crash the software application when the feature is used and may use the configuration settings, including the crash settings, to control such intentional crashing. Thus, the functionality described herein is not limited to identifying unexpected or implemented software uses and has applicability to other types of software uses needing tracking.

Various features and advantages of some embodiments are set forth in the following claims.

What is claimed is:

1. A system for controlling an intentional crash of a software application, the system comprising:
   a computing device including an electronic processor, the electronic processor configured to
      receive a crash setting for the software application from a configuration server, the crash setting having a first value or a second value,
      detect an unexpected use of the software application during execution,
      in response to detecting the unexpected use and the crash setting having the first value, intentionally crash the software application causing a generation of a crash report describing a state of the software application when the unexpected occurred,
      in response to detecting the unexpected use and the crash setting having the second value, not intentionally crash the software application, and
      perform at least one action selected from the group consisting of ignore the unexpected use, generate an error message, and a default action received from the configuration server,
      wherein, the unexpected use is at least one of a use for which there is no corresponding code to execute and a calling code that is unexpected based on a state of the software application.

2. The system of claim 1, wherein the electronic processor is further configured to receive an updated crash setting from the configuration server after intentionally crashing the software application, wherein the updated crash setting has the second value.

3. The system of claim 1, wherein the electronic processor is further configured to automatically update the crash setting to the second value after intentionally crashing the software application.

4. The system of claim 1, wherein the electronic processor is further configured to transmit the crash report to a crash reporting server.

5. The system of claim 1, wherein the electronic processor is further configured to determine whether at least one condition is satisfied and wherein the electronic processor is configured to determine whether to intentionally crash the software application in response to detecting the unexpected use based on the crash setting and the at least one condition.

6. The system of claim 5, wherein the at least one condition includes at least one selected from a group consisting of a predetermined subscription level, a predetermined time, a predetermined set of other software applications being executed by the electronic processor, and a predetermined type of the unexpected use.

7. The system of claim 1, wherein the electronic processor is configured to receive the crash setting in a set of configuration settings received from the configuration server in response to initial execution of the software application.

8. The system of claim 1, wherein the electronic processor is configured to receive the crash setting in a set of configuration settings received from the configuration server in response to detection of the unexpected use.

9. A method for controlling an intentional crash of a software application, the method comprising:
  receiving, with an electronic processor, a crash setting for the software application from a configuration server, the crash setting having a first value or a second value;
  detecting, with the electronic processor, a predetermined use of the software application during execution;
  in response to detecting the predetermined use and the crash setting having the first value, intentionally crashing, with the electronic processor, the software application causing generation of a crash report describing a state of the software application when the predetermined use occurred;
  in response to detecting the predetermined use and the crash setting having the second value, not intentionally crashing the software application; and
  performing at least one action selected from the group consisting of ignoring the predetermined use, generating an error message, and a default action received from the configuration server,
  wherein, the predetermined use is at least one of a use for which there is no corresponding code to execute and a calling code that is unexpected based on a state of the software application.

10. The method of claim 9, further comprising:
  in response to intentionally crashing the software application, updating the crash setting to the second value.

11. The method of claim 10, wherein updating the crash setting includes updating the crash setting based on a crash count threshold.

12. The method of claim 9, further comprising:
  transmitting the crash report to a crash reporting server.

13. A non-transitory computer-readable medium including instructions executable by an electronic processor to perform a set of functions, the set of functions comprising:
  receiving a crash setting for a software application from a configuration server, the crash setting having a first value or a second value;
  detecting a predetermined use of the software application during execution;
  in response to detecting the predetermined use and the crash setting having the first value,
    intentionally crashing the software application causing a generation of a crash report describing a state of the software application when the predetermined use occurred, and
    transmitting the crash report to a crash reporting server; and
  in response to detecting the predetermined use and the crash setting having the second value, not intentionally crashing the software application, and
  perform at least one action selected from the group consisting of ignore the predetermined use, generate an error message, and a default action received from the configuration server,
  wherein, the predetermined use is at least one of a use for which there is no corresponding code to execute and a calling code that is unexpected based on a state of the software application.

14. The non-transitory computer-readable medium of claim 13, wherein the set of functions further comprises receiving an updated crash setting having the second value.

15. The non-transitory computer-readable medium of claim 13, wherein the default action is based on a configuration setting received from the configuration server.

* * * * *